(12) United States Patent
Jing et al.

(10) Patent No.: US 12,442,456 B2
(45) Date of Patent: Oct. 14, 2025

(54) SYSTEMS AND METHODS FOR A VALVE AND A VALVE ASSEMBLY

(71) Applicant: Emerson Automation Solutions Final Control US LP, Houston, TX (US)

(72) Inventors: Chen Jing, Shanghai (CN); Chen Yuanyuan, Shanghai (CN); Li Chen Chen, Shanghai (CN); Nalinkumar Rajput, Stafford, TX (US); Vishwa Kalyanasundaram, Stafford, TX (US)

(73) Assignee: Emerson Automation Solutions Final Control US LP, Houston, TX (US)

( * ) Notice: Subject to any disclaimer, the term of this patent is extended or adjusted under 35 U.S.C. 154(b) by 29 days.

(21) Appl. No.: 18/529,129

(22) Filed: Dec. 5, 2023

(65) Prior Publication Data
US 2024/0191807 A1    Jun. 13, 2024

(30) Foreign Application Priority Data

Dec. 7, 2022 (CN) .......................... 202211560417.4

(51) Int. Cl.
*F16K 17/04* (2006.01)
(52) U.S. Cl.
CPC .................................... *F16K 17/04* (2013.01)
(58) Field of Classification Search
CPC . F16K 17/04; F16K 17/06; F16K 1/36; F16K 1/32; F16K 17/0413; F16K 17/082; F16K 17/08; Y10T 137/7832
See application file for complete search history.

(56) References Cited

U.S. PATENT DOCUMENTS

| | | | | | |
|---|---|---|---|---|---|
| 2,815,040 | A | * | 12/1957 | Smith | F16K 17/0433 251/360 |
| 3,702,142 | A | * | 11/1972 | Richardson | F16K 17/087 137/472 |
| 3,848,632 | A | * | 11/1974 | Powell | F16K 47/02 92/182 |
| 3,854,494 | A | * | 12/1974 | Zahorsky | F16K 17/0433 137/472 |
| 4,480,660 | A | * | 11/1984 | Bayart | F16K 17/0433 137/478 |
| 2002/0166588 | A1 | * | 11/2002 | Dean | F16K 17/04 137/542 |

FOREIGN PATENT DOCUMENTS

DE    4405913 A1 *    9/1994    ......... F16K 17/0433

OTHER PUBLICATIONS

Anderson Greenwood, Direct Spring Operated Pressure Relief Valves Series 60 and 80 data sheets, 2023, 72 pages.
Crosby Omni-Trim Direct Spring Pressure Relief Valves data sheets, Emerson, 2023, 40 pages.

* cited by examiner

*Primary Examiner* — Jessica Cahill
(74) *Attorney, Agent, or Firm* — Quarles & Brady LLP

(57) ABSTRACT

A spring-operated relief valve can include a main spring positioned between a bottom spring seat and a top spring seat. A seat assembly can include a valve seat, a seat retainer, and a spindle. The valve seat and the spindle can be received within an inner bore of the seat retainer and the spindle and the seat retainer can be threadably coupled. The valve seat can extend partially through the seat retainer to form a seal with a nozzle of the spring-operated relief valve and the spindle can engage the bottom spring seat to compress the main spring during a valve relief event.

20 Claims, 8 Drawing Sheets

SYSTEMS AND METHODS FOR A VALVE AND A VALVE ASSEMBLY

CROSS-REFERENCE TO RELATED APPLICATION

This application claims priority to Chinese Patent Application No. 202211560417.4 filed Dec. 7, 2022, the disclosure of which is incorporated herein by reference in its entirety.

BACKGROUND

Safety relief valves are used extensively in systems and vessels where pressure protection is required. For example, in some systems, excess pressure can lead to a process upset, instrument failure, or other equipment failure. Pressure relief valves can allow excess pressure to be relieved by allowing pressurized fluid to flow from an auxiliary passage out of the system.

SUMMARY

Some examples of the disclosed technology can provide a valve (e.g., a spring-operated relief valve), a sub-assembly for a valve, or a method for assembling or operating a valve. Correspondingly, some examples can provide improved arrangements for sealing elements and assemblies of valves or improved flow characteristics for valves (e.g., during valve simmer, or at other nearly closed orientations).

Some examples of the disclosed technology can provide a spring-operated relief valve that includes a valve body, a nozzle with a sealing surface, and a main spring positioned between a bottom spring seat and a top spring seat. A valve seat can be arranged to form a seal with the nozzle when the spring-operated relief valve is in a closed orientation. A spindle can have a distal end and a proximal end, the distal end arranged to urge the bottom spring seat toward the top spring seat as the valve seat is moved away from the nozzle during a valve relief event to compress the main spring between the bottom spring seat and the top spring seat. A seat retainer can have an inner bore that receives the valve seat and receives the proximal end of the spindle to couple the spindle to the seat retainer and axially secure the valve seat within the inner bore, with a sealing end of the valve seat extending out of the inner bore at a sealing end of the seat retainer.

In some examples, a sealing end of a seat retainer can define a shroud. With a spring-operated relief valve in the closed orientation to form a seal, the shroud can define a cavity around the seal.

In some examples, a shroud can include an annular lip with an inner diameter that can be larger than an outer diameter of a nozzle at a sealing surface thereof. In some examples, the annular lip can define an outer diameter of the sealing end of the seat retainer.

In some examples, a travel stop can extend from the sealing end of a seat retainer. The travel stop can be aligned to contact the nozzle with the spring-operated relief valve in the closed orientation to stop travel of the spindle toward the nozzle.

In some examples, a travel stop can include an annular protrusion at the sealing end of the seat retainer. The annular protrusion can be adjacent to the sealing end of the valve seat.

In some examples, a cavity formed by a shroud can include a recessed channel. The recessed channel can be partly defined by a travel stop.

In some examples, a seat retainer can include an exhaust port in communication with an inner bore of the seat retainer to vent the inner bore. The exhaust port can be oriented on a spindle side of a seal when a spring-operated relief valve is in the closed orientation.

In some examples, a proximal end of a spindle can include a recess that receives and aligns a seat for compression between a seat retainer and the spindle.

In some examples, a valve seat can define a first diameter at the sealing end of the valve seat, a second diameter along a body of the valve seat, and a third diameter axially opposite the sealing end of the valve seat. The second diameter can be larger than the first diameter or can be larger than the third diameter. The third diameter can be sized to be received into the recess of the proximal end of the spindle. The first diameter can be sized to be received into and through an opening at a sealing end of a seat retainer to form a seal with a sealing surface of a valve.

In some examples, a spindle can include an exhaust port that can extend to vent a recess of the spindle into the inner bore as the valve seat is compressed into the recess.

In some examples, a spindle can include a collar arranged to provide a stop for threaded installation of the seat retainer onto the proximal end of a spindle (e.g., to provide a predetermined compression of a valve seat). The collar can include an annular flange (e.g., with flattened portions to provide grips).

Some examples of the disclosed technology can include a valve seat assembly for a spring-operated relief valve. The valve seat assembly can include a valve seat, a seat retainer, and a spindle. The valve seat can include a sealing end with a first diameter and a sealing surface, and a body with a second diameter that can be larger than the first diameter. The seat retainer can have an inner bore with a bore diameter sized to receive the body of the valve seat, the inner bore extending between a first opening at a spindle end of the seat retainer and a second opening defined by an annular projection at a sealing end of the seat retainer. The spindle can be threadably secured in the inner bore. The seat can be received within the inner bore, with the body of the valve seat seated on the annular projection of the seat retainer and the sealing end of the valve seat extending through the second opening to expose the sealing surface outside of the inner bore. The spindle can axially retain the valve seat within the inner bore with the body of the valve seat seated on the annular projection of the seat retainer.

In some examples the valve seat assembly can be further configured or can include further elements according to any of the other examples listed above.

Some examples of the disclosed technology can include a method of assembling a valve or valve seat subassembly. For example, a method can include forming a valve seat subassembly. A valve seat can be inserted through a first opening into an inner bore of a seat retainer so that a sealing end of the valve seat extends into a second opening at a sealing end of the inner bore of the seat retainer. A proximal end of a spindle can be threaded into the first opening of the inner bore of the seat retainer to axially secure the valve seat within the inner bore.

In some examples, a bottom spring seat, a spring seated on the bottom spring seat, and a nozzle with a sealing surface can be arranged in a valve body. A valve seat subassembly can be inserted into the valve body of a valve so that the sealing end of the valve seat is arranged to form a seal with a sealing surface of a nozzle of the valve when the valve is in a closed orientation. The valve seat subassembly can be inserted into the valve body of a valve so that the spindle is arranged to receive spring force from a biasing spring of the valve to urge the valve seat subassembly toward the sealing surface of the nozzle.

In some examples, the method can include further operations to assemble the valve or the valve seat subassembly according to any of the other examples listed above.

In some examples, a method of assembling a valve can include retrofitting the valve with a valve seat subassembly.

BRIEF DESCRIPTION OF THE DRAWINGS

The accompanying drawings, which are incorporated in and form a part of this specification, illustrate examples of the disclosed technology and, together with the description, serve to explain the principles of examples of the disclosed technology.

DETAILED DESCRIPTION

Figure 1:
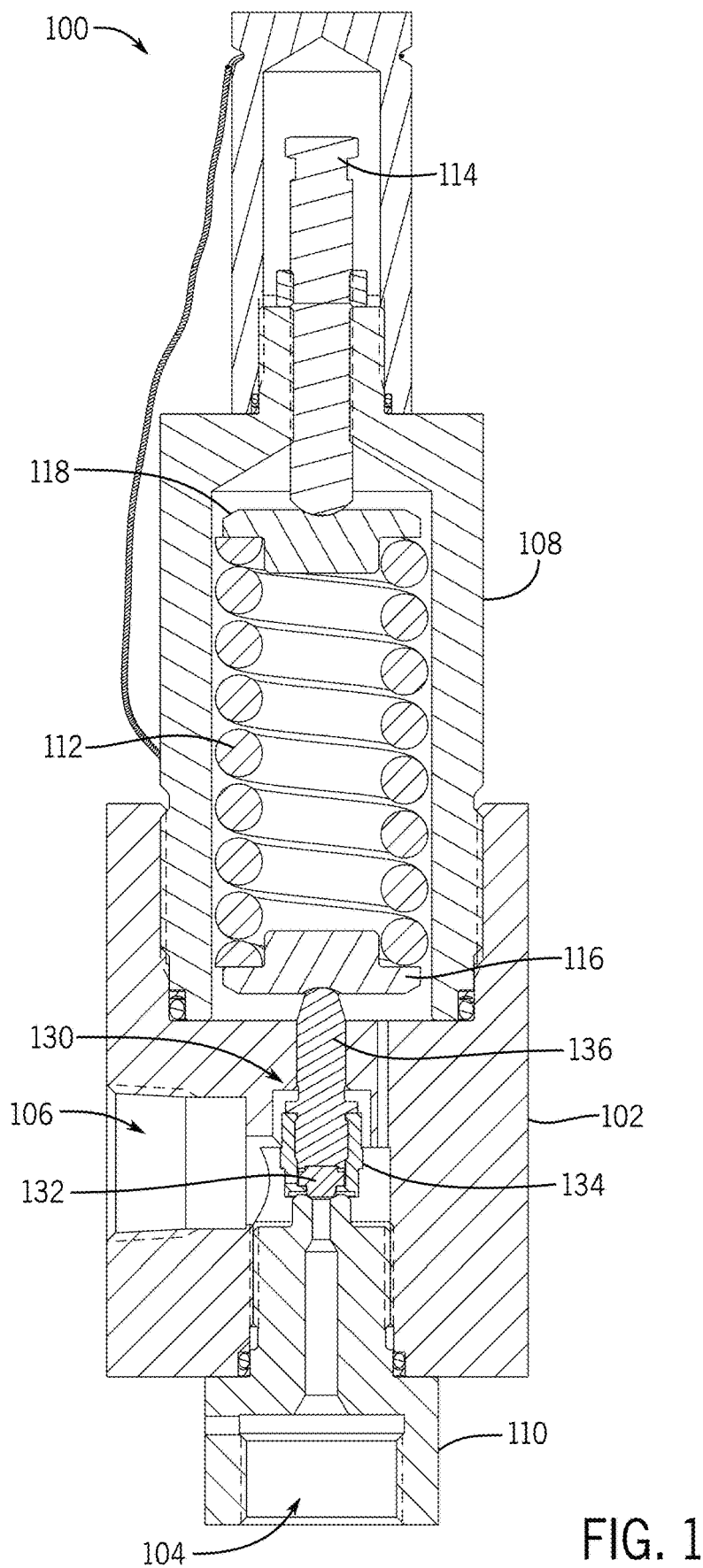
FIG. 1 is a cross-sectional view of a pressure relief valve including a valve seat assembly (or subassembly) according to an example of the disclosed technology.

The following discussion is presented to enable a person skilled in the art to make and use examples of the disclosed technology. Various modifications to the illustrated examples will be readily apparent to those skilled in the art, and the generic principles herein can be applied to other examples and applications without departing from examples of the disclosed technology. Thus, the disclosed technology is not intended to be limited to examples shown, but is to be accorded the widest scope consistent with the principles and features disclosed herein. The following detailed description is to be read with reference to the figures, in which like elements in different figures have like reference numerals. The figures, which are not necessarily to scale, depict selected examples and are not intended to limit the scope of examples of the disclosed technology. Skilled artisans will recognize the examples provided herein have many useful alternatives and fall within the scope of examples of the disclosed technology.

Before any examples of the disclosed technology are explained in detail, it is to be understood that the disclosed technology is not limited in its application to the details of construction and the arrangement of components set forth in the following description or illustrated in the attached drawings. The disclosed technology is capable of other examples and of being practiced or of being carried out in various ways. Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items.

As used herein, unless otherwise specified or limited, the terms "mounted," "connected," "supported," "secured," and "coupled" and variations thereof, as used with reference to physical connections, are used broadly and encompass both direct and indirect mountings, connections, supports, and couplings. Further, unless otherwise specified or limited, "connected," "attached," or "coupled" are not restricted to physical or mechanical connections, attachments or couplings.

Also as used herein, unless otherwise limited or defined, "integral" and derivatives thereof (e.g., "integrally") describe elements that are manufactured as a single piece without fasteners, adhesive, or the like to secure separate components together. For example, an element stamped, cast, or otherwise molded as a single-piece component from a single piece of sheet metal or using a single mold, without rivets, screws, or adhesive to hold separately formed pieces together is an integral (and integrally formed) element. In contrast, an element formed from multiple pieces that are separately formed initially then later connected together, is not an integral (or integrally formed) element.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "only one of," or "exactly one of." For example, a list of "only one of A, B, or C" indicates options of: A, but not B and C; B, but not A and C; and C, but not A and B. In contrast, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more A, one or more B, and one or more C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: one or more A and one or more B; one or more B and one or more C; one or more A and one or more C; and one or more A, one or more B, and one or more C.

In some implementations, devices or systems disclosed herein can be utilized, manufactured, installed, etc. using methods embodying aspects of the invention. Correspondingly, any description herein of particular features, capabilities, or intended purposes of a device or system is generally intended to include disclosure of a method of using such devices for the intended purposes, of a method of otherwise implementing such capabilities, of a method of manufacturing relevant components of such a device or system (or the device or system as a whole), and of a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as embodiments of the invention, of the utilized features and implemented capabilities of such device or system.

As briefly discussed above, certain systems and vessels require pressure protection to avoid over-pressurization. Relief valves, including spring-operated pressure relief valves can be used in such systems to relieve and divert excess fluid pressure. In general, spring-operated pressure relief valves include a spring that is compressed by a predetermined value. The spring provides an axial force on a valve disc in a valve-closing direction (e.g., downward), thereby biasing the valve toward a closed orientation. The compression of the spring can be adjusted via a spring adjustment mechanism, such as an adjustable screw that controls the degree of compression of the spring for a given valve lift. When an opening (e.g., upward) force exerted by a pressurized fluid acting on the valve disc equals the closing (e.g., downward) force of the spring, plus any ancillary forces (e.g., due to the weight of a disc assembly), the valve begins to open. As the fluid pressure continues to increase, the spring is further compressed, and the valve is further opened.

Spring-operated pressure relief valves are generally configured to provide a set pressure, which is typically predetermined and preset before installation of the valves. The set pressure is typically a pressure at which the valve opens and there is a significant relief of system pressure, although other definitions are applied in different installations, as is known in the industry. In some instances, the set pressure may be defined as the pressure at which a first audible response (i.e., "pop") can be heard by a user, as a spring-operated pressure relief valve releases system pressure, or may be defined as the pressure at which leakage through a valve is first audible for human operators. As appropriate, the set pressure for a particular valve can be adjusted by varying the compression of a spring within the valve, including by adjusting a pressure adjustment screw to compress or release a spring by a certain amount.

In addition to a set pressure, spring-operated pressure relief valves further define a crack pressure. The crack pressure is a pressure at which the disc assembly of the valve first begins to lift from the valve seat in response to system pressure. In other words, the crack pressure may be defined as a pressure at which the force of the fluid on a line side of the valve seat equals the force exerted by the spring (and any ancillary forces) on a relief side of the valve seat. The effect of a system reaching crack pressure can be minute fluid leakage or a low decibel audible noise (e.g., such as may not necessarily be audible to human operators). A valve simmer can be defined when there is an audible or visible escape of fluid between the disc and the seat that occurs when the valve opens slightly.

In some cases, when a spring-operated pressure relief valve is at crack pressure, the valve may lift from the valve seat. In some systems, the set pressure value can be a small percentage (e.g., 3-5%) larger than a crack pressure value, such that a set pressure can be defined relative to a crack pressure (or vice versa), although other approaches are possible. In general, valve lift can be defined as a distance between seating surfaces of the valve and a nozzle in a spring-operated pressure relief valve, as the valve transitions between closed and open orientations. The lift is said to be zero when the valve is in a closed orientation, and the lift reaches a maximum when the valve is in a fully opened orientation, passing through a series of partly open orientations therebetween.

Spring-operated pressure relief valves can further define a blowdown pressure. The blowdown pressure corresponds to a pressure below the set pressure where the valve recloses after opening. In some industries, a standard (e.g., required) blowdown pressure for a spring-operated pressure relief valve is greater than 3% below the set pressure. Relatedly, an overpressure for a spring-operated pressure relief valve can be defined as the required increase in pressure above the set pressure to achieve the relieving capacity of the valve (e.g., to move the valve to full lift). In some industries, a standard overpressure is less than 10% above the set pressure. However, different standards or requirements for overpressure and the blowdown pressure are possible.

As briefly discussed above, a spring-operated pressure relief valve can experience simmering when a small amount of fluid escapes between the disc and the seat due to the valve being opened slightly, just after the crack pressure and before the set pressure (e.g., a popping pressure). In general, a long simmer may be undesirable because it can increase the time between the crack pressure and the popping pressure, including as may require the valve to have an overpressure that is greater than 10% of the set pressure to achieve a rated capacity. In some instances, decreasing the overpressure can correspondingly increase the blowdown time, which can correspond to an increase of product loss.

In general, simmering can occur when the fluid pressure is above the crack pressure and below the set pressure. Often, a simmering effect is more pronounced in valves with low set pressures that operate with compressible media, and valves at low to mid set pressure that operate with incompressible media.

As described above, spring-operated pressure relief valves can be used in a variety of systems to relieve and divert excess fluid pressure. By way of example, some systems may include high pressure fluids (e.g., over 22,000 psig) with low molecular weights (e.g., hydrogen and helium). Some conventional spring-operated pressure relief valves can face challenges associated with such high pressures and low molecular weight fluids, including providing necessary seat tightness to avoid valve leakage and other unwanted valve events.

In some valves, a seat arrangement comprising a thermoplastic or other suitable material may be encapsulated between a seat retainer and a spindle of the valve. Generally this configuration is suited for large orifice valves and relatively low pressure fluids (e.g., on the order of 10,000 psig). However, there can be drawbacks with such arrangements when the valve is scaled down to accommodate a smaller nozzle orifice size (e.g., between 1/16 inch and 1/4 inch nozzles). These drawbacks include the physical constraint on the seat retainer becoming a limiting factor as the spindle, seat, and seat retainer are scaled down. The reduction in size can restrict the size of a conventional threaded joint between the seat retainer and the spindle, which in turn restricts the preload that can be applied on the threaded joint. The restricted preload can restrict the maximum load that the threaded joint can withstand. Thus, simply scaling down particular designs may not provide valves that are suitable for high fluid pressure (and high set pressure) applications.

Additionally, some valves can include a soft valve seat assembly that includes an O-ring. The O-ring can be made to contact the outer edge of a nozzle and relies on fluid pressure from the fluid flowing past the valve seat during a valve event (e.g., valve opening and closing) to retain the O-ring. These valves can include certain drawbacks. For example, at high pressures, and especially during simmering or at low lift, high fluid velocities can dislocate the O-ring from the valve gland. Similar dislocation can also happen when the valve reseats at high set pressures. Thus, some conventional valve seats are not suitable for high pressure or small nozzle applications.

Examples of the disclosed technology address these and other drawbacks of conventional valves and valve seats. In particular, examples of the disclosed technology provide a valve seat assembly configured for use in a relief valve, such as a spring-operated pressure relief valve, that can be employed in high pressure (e.g., over 20,000 psig) applications, including high working fluid pressures and high set pressures. Examples of the disclosed technology provide a valve seat assembly including a seat positioned within a seat retainer and secured axially via a spindle. The spindle can be secured to the seat retainer via a threaded connection. In particular, the threaded connection can be independent from the seat so that a strong threaded connection can be formed between the spindle and the seat retainer without expending connection strength to the seat itself.

In some examples, a threaded connection between a spindle and seat retainer may include a threaded insert or threaded reinforcement (e.g., a Helicoil®), or may be formed using various other known approaches for threading bores of manufactured components. (Helicoil is a registered trademark of Böllhoff Group.) The threaded insert may be fixed relative to one of the spindle or the seat retainer and the other of the spindle or the seat retainer may include corresponding threads to threadably engage the threaded insert so that the spindle and the seat retainer can be fixed relative to one another via a threaded connection. In some examples, the corresponding threads that engage the threaded insert can be integrally formed with one of the spindle or the seat retainer. However, in other examples, each of the spindle and the seat retainer can include integrally (i.e., unitarily) formed threads that are dimensioned to provide a threaded connection with each other to couple the spindle and the seat retainer. Likewise, in some examples, a seat retainer and a spindle can be integrally threaded.

During an assembly process of a seat assembly according to examples of the disclosed technology, a seat may be placed in an inner bore of a seat retainer. In particular, the seat may be placed (e.g., dropped) through a first opening of the inner bore so that the seat is seated on a retaining feature of the seat retainer with the seat extending at least partially through a second opening of the inner bore that is axially opposite the first opening. After the seat is thus placed in the inner bore of the seat retainer, thereby axially aligning the seat with the seat retainer, the spindle can be threadedly connected to the seat retainer. In particular, a proximal (e.g., lower) end of the spindle can be threaded into the inner bore of the seat retainer via the first opening of the seat retainer. When the spindle is fully threaded into the inner bore, the spindle may thus axially secured the seat between the proximal end of the spindle and the seat retainer. The seat may also thus be secured to at least partially extend to be exposed outside the seat retainer so that the seat can form a seal with a nozzle of a relief valve. In some examples, the spindle can be threaded into the inner bore until a collar of the spindle abuts an outer rim of the seat retainer adjacent to the first opening of the inner bore (e.g., to provide, via the physical dimensions of the relevant components, a predetermined pre-compression of the seat).

In some examples, a fully assembled valve seat assembly according to examples of the disclosed technology may form a seat subassembly that can be installed into a valve (e.g., as a retrofit subassembly). The seat subassembly may be configured to be inserted into a relief valve, such as, for example, a spring-operated pressure relief valve.

In some examples, a relief valve may be partially assembled so that the seat subassembly can be inserted through an opening in a nozzle support of the relief valve from a bottom (or other side) of the valve and a nozzle for the valve can be secured at the nozzle support after the seat subassembly to secure the seat subassembly within the relief valve. Once the seat subassembly and the nozzle are secured to the body of the relief valve, the relief valve may be fully assembled. The seat subassembly may then also be removed from the valve by simply removing the valve nozzle so that the seat assembly can be maintained, repaired, or replaced via the opening in the nozzle support.

Referring now to FIG. 1, a spring-operated pressure relief valve 100 is shown. The spring-operated pressure relief valve 100 includes a valve body 102 having an inlet 104 and an outlet 106. The spring-operated pressure relief valve 100 also includes a bonnet 108, a nozzle 110, a main spring 112, and an adjustment screw 114. As shown, the main spring 112 is disposed between a first (e.g., bottom) spring seat 116 and a second (e.g., top) spring seat 118, and the nozzle 110 is engaged with a nozzle support portion of the valve body 102 on an opposite side of the bottom spring seat 116 from the top spring seat 118. Thus, the main spring 112 can provide a biasing force toward the nozzle 110, via the bottom spring seat 116, to close the valve 100.

According to examples of the disclosed technology, the spring-operated pressure relief valve 100 can also include a valve seat assembly 130 adjacent to the bottom spring seat 116 and the nozzle 110. In some examples, the valve seat assembly 130 may be configured as a subassembly that is pre-assembled and then collectively installed on the valve 100. For example, the valve seat assembly 130 as a subassembly may be assembled separately from a valve, such as the spring-operated pressure relief valve 100, and configured to be incorporated with the valve during an assembly process or a maintenance process.

In the illustrated example, as generally shown in FIG. 1, the valve seat assembly 130 includes a seat 132, a seat retainer 134, and a spindle 136. The seat 132 can be configured to engage the nozzle 110 to provide a seal against flow through the valve 100 and the spindle 136 can be configured to engage the bottom spring seat 116 to transmit biasing force from the main spring 112 to the seat 132 to provide the seal with the nozzle 110. In use, during a relief event, the valve seat assembly 130 may lift off the nozzle 110 so that the seat 132 is lifted from a sealing surface 140 of the nozzle 110 and the spindle 136 correspondingly may compress the main spring 112 by urging the bottom spring seat 116 toward the top spring seat 118.

Figure 2:
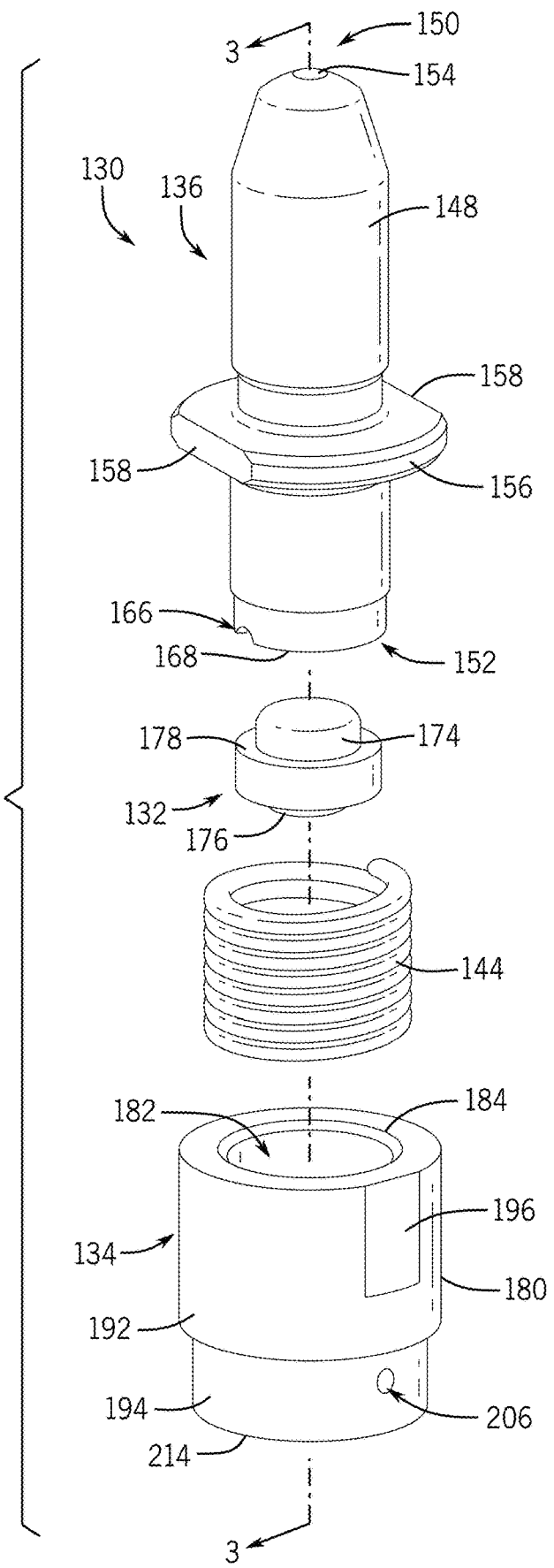
FIG. 2 is an exploded isometric view of the valve seat assembly of FIG. 1.

FIG. 2 illustrates the valve seat assembly 130 according to an example of the disclosed technology. As described above, the valve seat assembly 130 can include the seat 132, the seat retainer 134, and the spindle 136. Generally, the spindle 136 and the retainer 134 can be configured for threaded engagement with each other. As shown in FIG. 2, in particular, the valve seat assembly 130 can thus sometimes further include a threaded member 144. In some examples, the threaded member 144 can be configured as a threaded insert (e.g., a Helicoil®) that is positioned between the spindle 136 and the seat retainer 134 when the valve seat assembly 130 is in an assembled configuration. In other examples, the threaded member 144 may be secured, adhered, or otherwise affixed to one of the seat retainer 134 or the spindle 136. The other of the seat retainer 134 or the spindle 136 may include a complementary set of threads (see FIG. 6) configured to make a threaded connection with the threaded member 144 so that the spindle 136 can be secured to the seat retainer 134 via a threaded engagement.

With continued reference to FIG. 2, the spindle 136 of the valve seat assembly 130 can define a spindle body 148 having a distal end 150 and a proximal end 152. The distal end 150 can include a spring seat engaging surface 154 configured to engage the bottom spring seat 116 and thus transmit force to and from the main spring 112 (e.g., to urge the bottom spring seat 116 to compress the main spring 112 during a valve relief event).

The spindle body 148 can further include a spindle collar 156 arranged between the distal end 150 and the proximal end 152. The spindle collar 156 can be generally configured as a flange extending radially from the spindle body 148, although other arrangements are possible. Further, in the illustrated example, the spindle collar 156 includes first and second grip surfaces 158. As shown, the first and second grip surfaces 158 are configured as flat portions of a generally round radial flange of the spindle collar 156. The grip surfaces 158 can be arranged on opposite sides (e.g., 180 degrees apart) on the spindle collar 156, or in other configurations. For example, additional grip surfaces 158 can be disposed around the spindle collar 156 so that the spindle collar 156 is configured as a nut having a plurality of grip surfaces that can be engaged with a wrench or other tool to turn or tighten the spindle 136 relative to the seat retainer 134 or valve 100. In other examples, grip surfaces of the spindle body 148 can include additional or alternative features that can be used to grip, tighten, or align the spindle 136, such as recesses or protrusions dimensioned to be engaged by a complementary shaped tool.

The proximal end 152 of the spindle 136 can be dimensioned to be received within the seat retainer 134. Additionally, in some examples, the proximal end 152 of the spindle 136 is dimensioned to be received within the threaded member 144 (see, for example, FIG. 6). Still, in other examples, the proximal end 152 of the spindle 136 can include threads dimensioned to mate with the threaded member 144 to provide a threaded coupling between the spindle body 148 and the seat retainer 134. In some arrangements, threads on the spindle 136 or within the seat retainer 134 can be self-tapping threads configured to form threads on the other element to provided threaded engagement therebetween.

The proximal end 152 of the spindle 136 can sometimes include a recess to receive part of a valve seat, as can help to further secure, align, and appropriately compress the valve seat for operation. For example, with reference to FIGS. 2 and 3, the spindle body 148 includes a lower rim 168 that defines an end recess that can receive a seat (e.g., the seat 132 as further discussed below). As also shown in the illustrated example, the proximal end 152 of the spindle 136 can further include an exhaust port 166 formed in a side wall of the proximal end 152 adjacent to a lower rim 168 of the spindle body 148. In particular, in the illustrated example, the exhaust port 166 intersects the lower rim 168 of the spindle body 148. However, in other configurations, one or more exhaust ports may be spaced apart from the lower rim 168 of the spindle body 148. Likewise, a recess to receive a valve seat can be formed with features other than an annular protruding rim.

Figure 3:
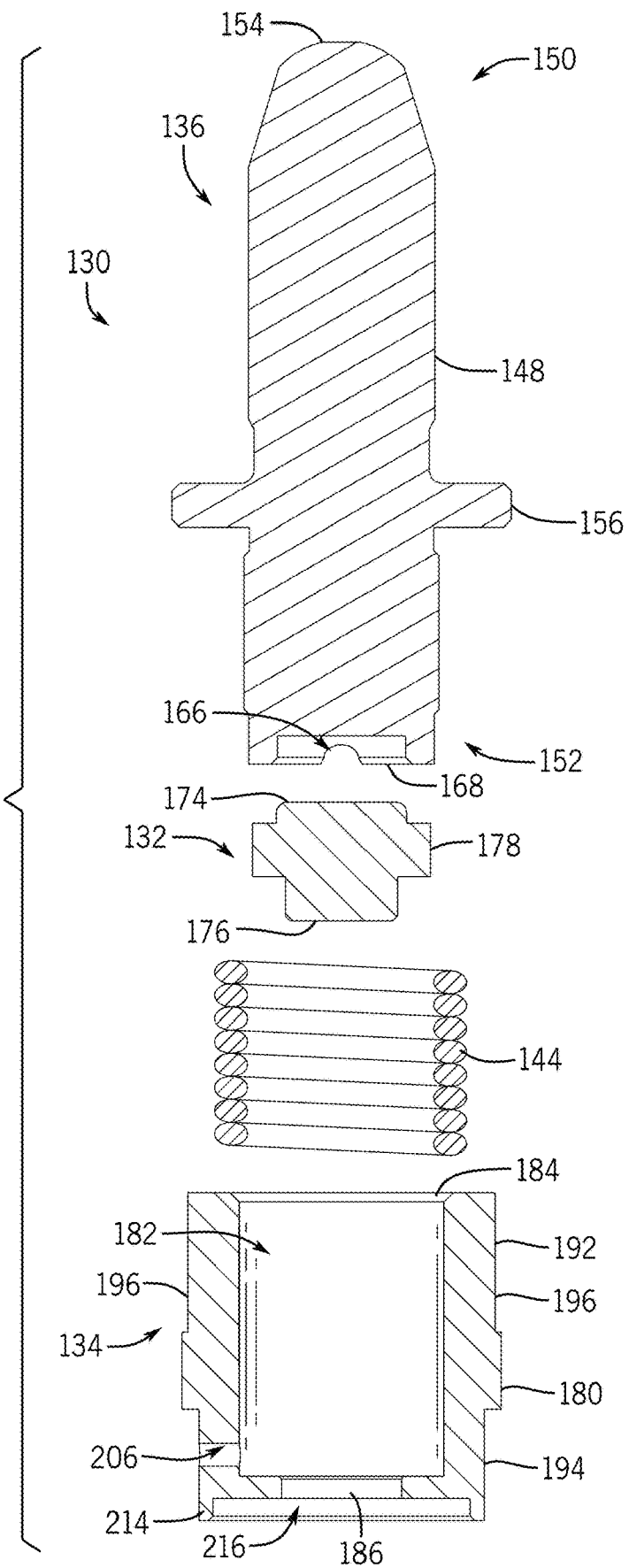
FIG. 3 is a cross-sectional side view of the valve seat assembly of FIG. 1 taken along line 3-3 of FIG. 2.

Still referring to FIGS. 2 and 3, the seat 132 of the valve seat assembly 130 defines a first end 174, a second end 176 axially opposite the first end 174, and a body therebetween with a larger diameter than either (or both) of the ends 174, 176. In particular, the body in the illustrated example forms an annular projection 178 that defines a wider middle diameter of the seat 13, although other configurations are possible. In the illustrated example, the first end 174 is a spindle end that is configured to extend toward (and in some examples, into) the proximal end 152 of the spindle 136 and the second end 176 is a sealing end configured to extend opposite the first end 174, toward the nozzle 110 of the valve 100, and through the seat retainer 134. In particular, the second end 176 can define a width (e.g., a diameter) that is less than a width (e.g., a diameter) of the annular projection 178 so that the second end 176 is permitted to extend to be exposed outside of the seat retainer 134 and the annular projection 178 is retained within the seat retainer 134, as will be described in further detail below with reference to FIG. 6.

As shown in FIGS. 2-5, the seat retainer 134 can include a seat retainer body 180 that defines an inner bore 182 dimensioned to receive the seat 132, the proximal end 152 of the spindle 136, and the threaded insert member 144 (as applicable). In other examples, the inner bore 182 may be similarly configured but may include integrally formed internal threads dimensioned to threadably engage the threaded member 144 or a corresponding portion of the spindle 136.

Figure 5:
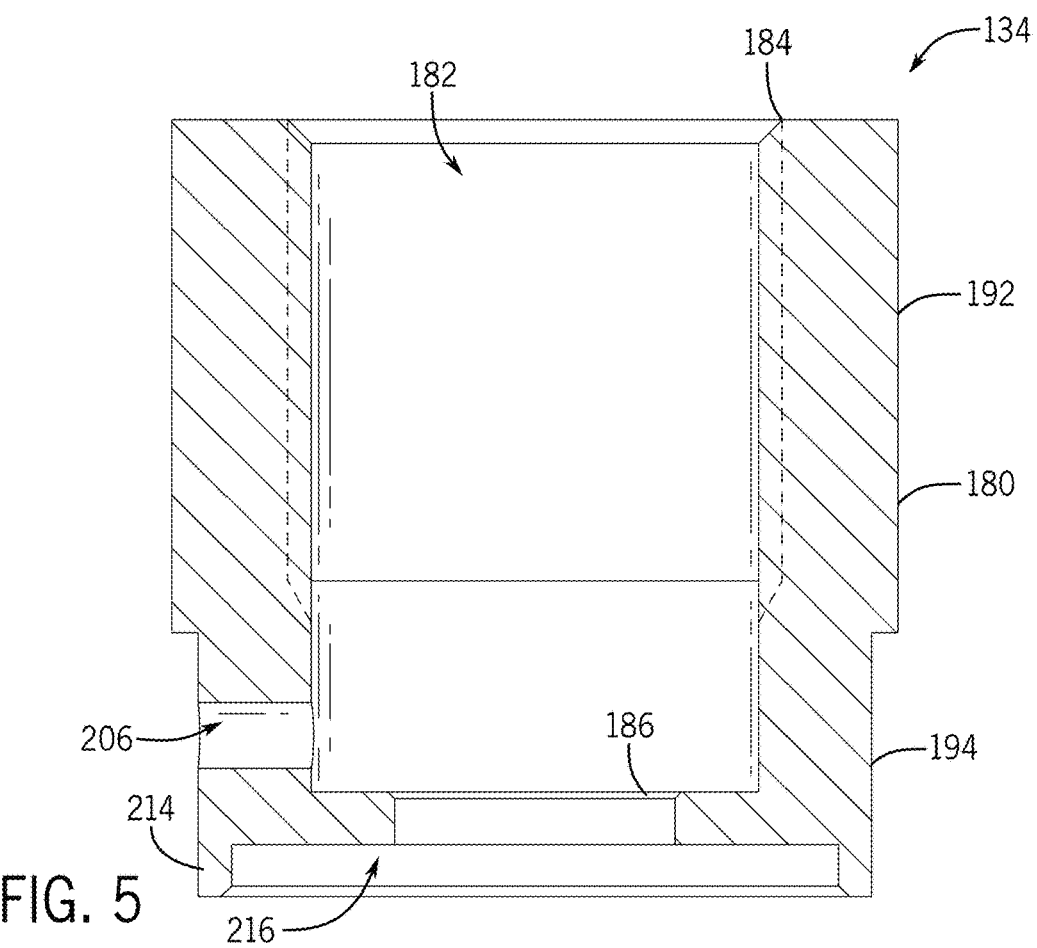
FIG. 5 is a cross-sectional side view of the seat retainer of FIG. 4.

As illustrated in FIG. 5, the inner bore 182 extends through the seat retainer body 180 in the axial direction and forms a first opening 184 and a second opening 186 on the axial ends of the seat retainer body 180. In the illustrated example, the first opening 184 defines a greater radius than the second opening 186. This can facilitate inserting the seat 132 into the seat retainer 134 during an assembly process of the valve seat assembly 130, as well as ensure axial alignment and retention of the seat 132 for operation.

For example, during an assembly process, the valve seat assembly 130 can be assembled by successively inserting each of the seat 132, the threaded member 144 (in some examples), and the proximal end 152 of the spindle 136 into the inner bore 182 via the first opening 184. Due to the differences in diameters, the seat 132 can be retained in the seat retainer 134 adjacent to the second opening 186, via interference at the second opening 186 between the seat retainer body 180 and the annular projection 178 of the seat 132 (see, for example, FIG. 6), but the second end 176 of the valve seat 132 can extend through the opening 186 to be exposed to provide a seal outside of the retainer 134. With the seat 132 in place, the spindle 136 can be threadably engaged with the seat retainer 134 by rotating either of the spindle 136 or the seat retainer 134 (i.e., by causing relative rotation of the two components), with the collar 156 providing a stop for appropriate alignment and compression of the valve seat 132 in some examples.

Once the valve seat assembly 130 is thus assembled, the valve seat assembly 130 can be inserted into the spring-operated pressure relief valve 100. For example, the valve seat assembly 130 can be inserted from a bottom of the valve 100 as shown (e.g., near the inlet 104), before the nozzle 110 is inserted and secured (e.g., threadably tightened) relative to the valve body 102.

Still referring to FIGS. 2-5, the seat retainer body 180 can further define a grip section 192 and a nozzle section 194. The grip section 192 can be used to grip, position, tighten, etc. the seat retainer 134 and valve seat assembly 130 during an assembly process and the nozzle section 194 is disposed adjacent to a valve nozzle (e.g., the nozzle 110 of the spring-operated pressure relief valve 100) when the valve seat assembly 130 is installed in a valve. As shown in FIG. 5, the first opening 184 is formed at the grip section 192 and the second opening 186 is formed at the nozzle section 194. Additionally, in the illustrated example, the grip section 192 defines a width (e.g., a diameter) that is greater than a width (e.g., a diameter) of the nozzle section.

Figure 4:
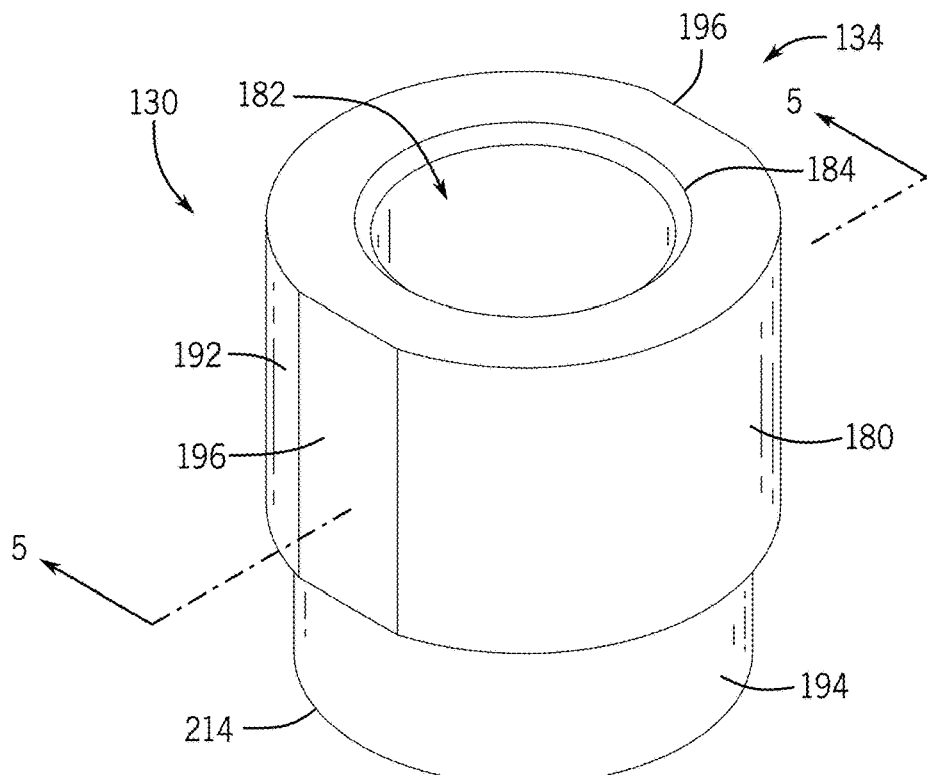
FIG. 4 is an isometric view of a seat retainer of the valve seat assembly of FIG. 1.

As shown in FIG. 4, the seat retainer body 180 can also include grip surfaces 196 at the grip section 192 of the seat retainer 134. First and second grip surfaces 196 can be configured as flat portions of a generally cylindrical seat retainer body 180. The grip surfaces 196 can be arranged on opposite sides (e.g., 180 degrees apart) at the grip section 192, or can be otherwise configured. For example, additional grip surfaces can be disposed around the seat retainer body 180 so that a portion of the seat retainer body 180 (e.g., at the grip section 192) is configured as a polygonal nut having a plurality of grip surfaces that can be engaged with fingers, a wrench, or other tools to turn and or tighten the valve seat assembly 130. In other examples, the seat retainer body 180 can include additional or alternative features that can be used to grip, tighten, or align the seat retainer 134, such as recesses or protrusions dimensioned to be engaged by a complementary shaped tool.

The seat retainer body 180 can further include an exhaust port 206 that extends through a wall of the seat retainer body 180 from the inner bore 182 through an outer surface of the nozzle section 194. In use, the exhaust port 166 of the spindle 136 and the exhaust port 206 of the seat retainer 134 can exhaust air or other fluid that could accumulate in the clearance between the seat 132 and spindle 136 and between the seat 132 and the seat retainer 134. For example, during an assembly process, the spindle 136 may be tightened relative to the seat retainer 134 via a threaded connection, to be pre-loaded to a particular torque to prevent unwanted loosening and disconnect between the spindle 136 and the seat retainer 134 during use of the valve seat assembly 130 in a valve. Each of the exhaust ports 166, 206 can allow air to escape during the assembly and pre-loading process so that a pre-loading force is not expended on compressing air or forcefully dispersing air accumulation, but rather on forming an appropriately tight connection.

Figure 6:
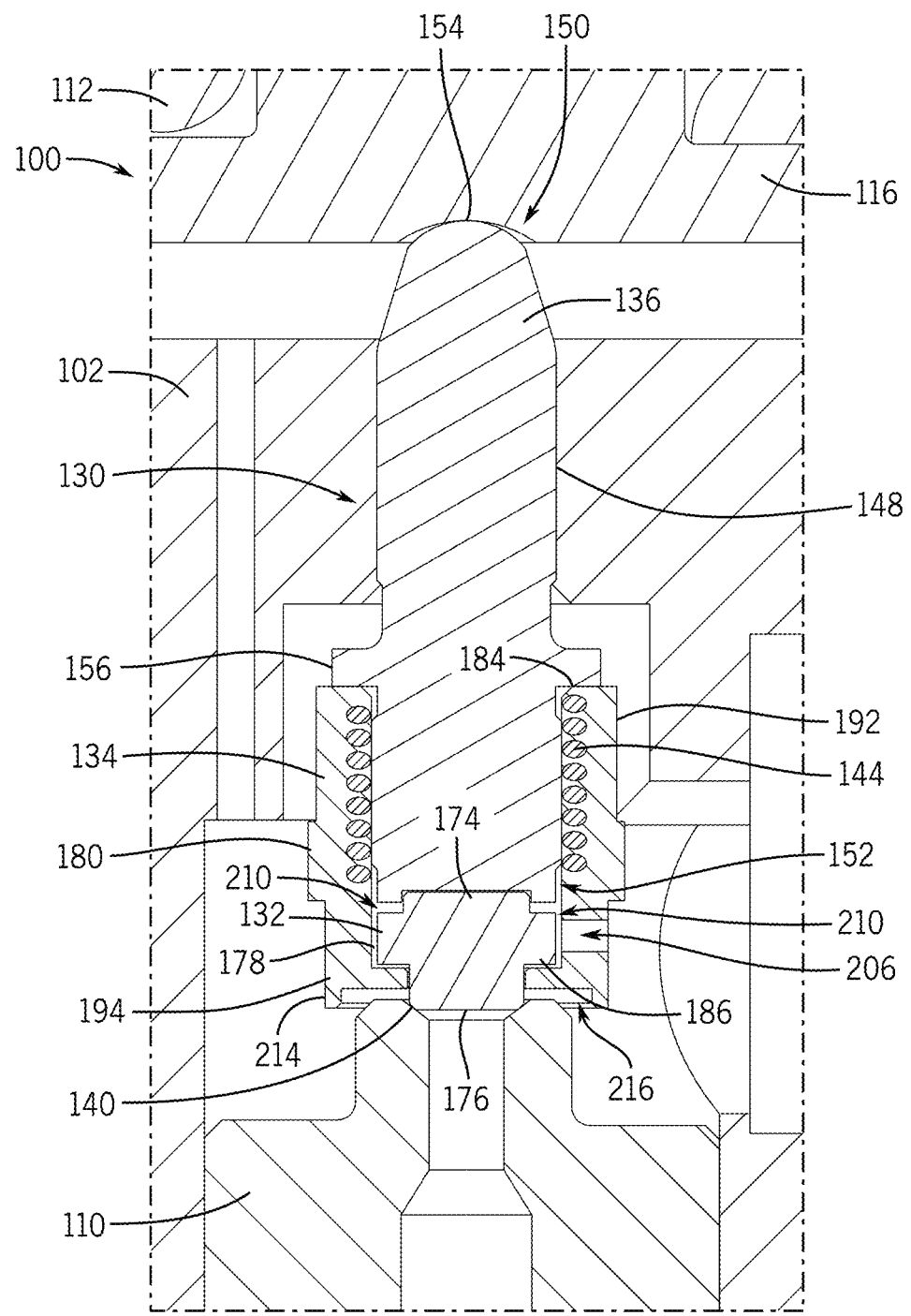
FIG. 6 is a zoomed in cross-sectional side view of the valve seat assembly as installed in the valve of FIG. 1.

Further, when the valve seat assembly 130 is installed in a valve (e.g., the spring-operated pressure relief valve 100), the exhaust ports 166, 206 can collectively prevent a working fluid of the valve from accumulating in clearance spaces between valve seat 132 and the spindle 136 and between the valve seat 132 and the seat retainer 134 after a valve relief event. In particular, as shown in FIG. 6, the exhaust port 206 is on a spindle side of a seal formed by the valve seat 132 when the valve is in the closed orientation (i.e., is downstream of the seal relative to a flow through the nozzle 110 toward the spindle 136. Thus, the exhaust ports 166, 206 can advantageously prevent fluid accumulation during an assembly of the valve seat assembly 130 and during a valve relief event (or other operational event) when the valve seat assembly 130 is installed in a valve. In some cases, however, valve assemblies can include only one of the ports 166, 206 or can include multiple ports arranged similarly to either of the ports 166, 206.

As shown in FIG. 6, clearance spaces 210 can be formed between the seat 132, the seat retainer 134, and the spindle 136. These clearance spaces 210 can facilitate the assembly of the valve seat assembly 130. For example, during an assembly process, the seat 132 can be placed (e.g., dropped) into the inner bore 182 of the seat retainer 134 so that the second end 176 of the seat 132 extends through the second opening 186 of the seat retainer 134 at the nozzle section 194, thereby axially aligning the seat 132 with the seat retainer 134. The threaded member 144 and the proximal end 152 of the spindle 136 can then be inserted into the inner bore 182 of the seat retainer 134 so that the proximal end 152 of the spindle 136 extends within the inner bore 182 at the grip section 192 of the seat retainer 134.

The proximal end 152 of the spindle 136 can engage the first end 174 of the seat 132 to secure the seat axially between the spindle 136 and the seat retainer 134. In particular, the body of the seat 132 can be seated, at the annular projections 178, on the annular projection (i.e., radial rim) that the seat retainer 134 forms around the second opening 186. Thus, the seat 132 can prevented from passing fully in the axial direction through the second opening 186 of the seat retainer 134, but a sealing surface at the second end 176 of the seat 132 can be exposed to form a seal during operation of a valve (see, e.g., FIG. 6). In the illustrated example, the proximal end 152 of the spindle 136 can include a recess dimensioned to receive the first end 174 of the seat 132 therein. In some examples, the recess formed in the proximal end 152 of the spindle 136 can facilitate axial alignment of the spindle 136 with the seat 132 and the seat retainer 134.

As shown in FIGS. 5 and 6, the seat retainer body 180 also includes a shroud 214 at the nozzle section 194 that forms a cavity 216 adjacent to the second opening 186. The shroud 214 is generally formed by an annular lip that extends around the diameter of the nozzle section 194. As shown in FIG. 6, the shroud 214 can extend around a nozzle (e.g., the nozzle 110) of a valve and the nozzle can extend at least partially into the cavity 216 formed by the shroud 214. In use, including during a valve relief event, fluid and fluid pressure can be directed into the cavity 216 formed by the shroud 214 to produce a stagnation and huddling effect. In general, a huddling effect can provide a supplemental upward force to lift the valve seat assembly 130 during a relief event. With appropriately configured shrouds, the supplemental upward force can provide an advantageous force augmentation that can reduce simmer. For example, once the seat 132 has left the sealing surface 140 of the nozzle 110, the assistive force of the huddling effect can result in steady or increased fluid pressure continuing to raise the valve seat assembly 130 rather than extended cycles of up and down movement (i.e., valve simmering).

Figure 7:
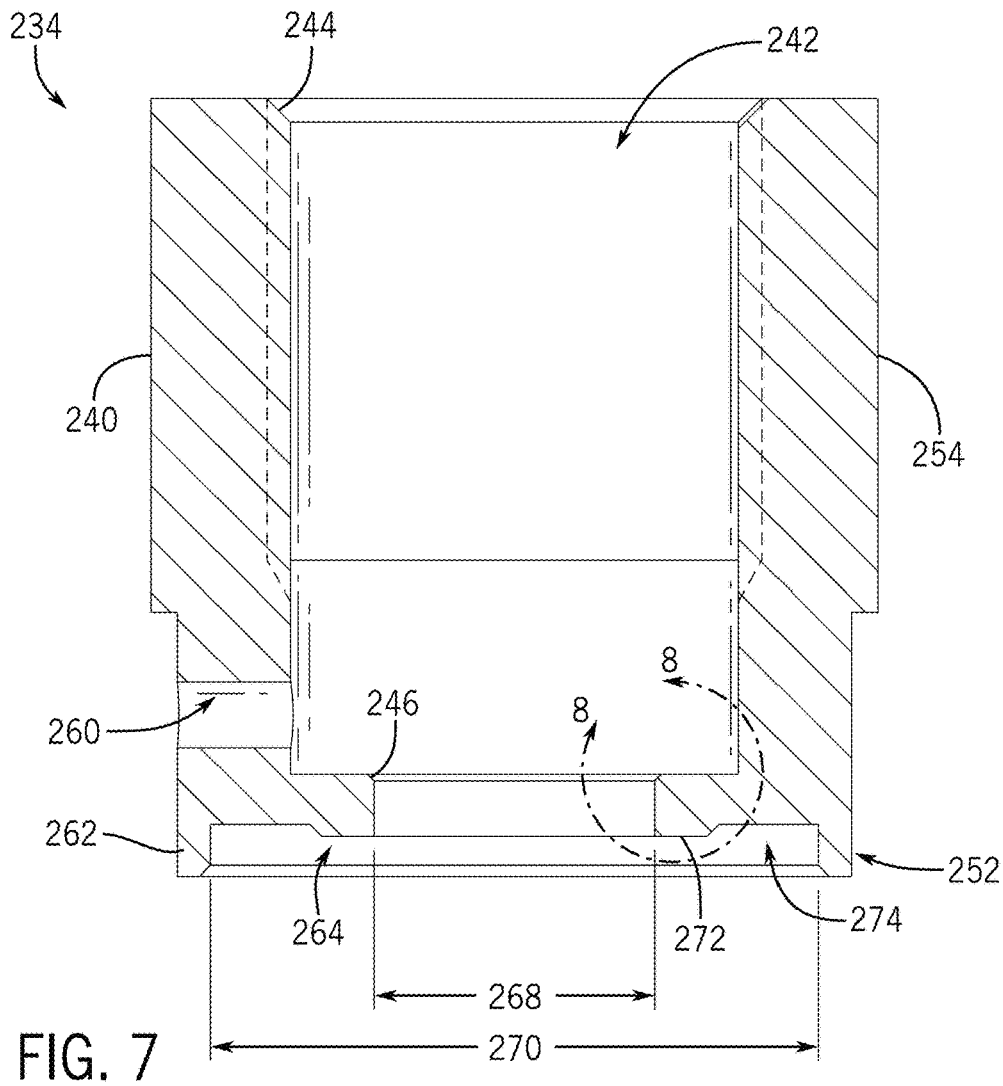
FIG. 7 is a cross-sectional side view of a seat retainer including a travel stop according to an example of the disclosed technology.
Figure 8:
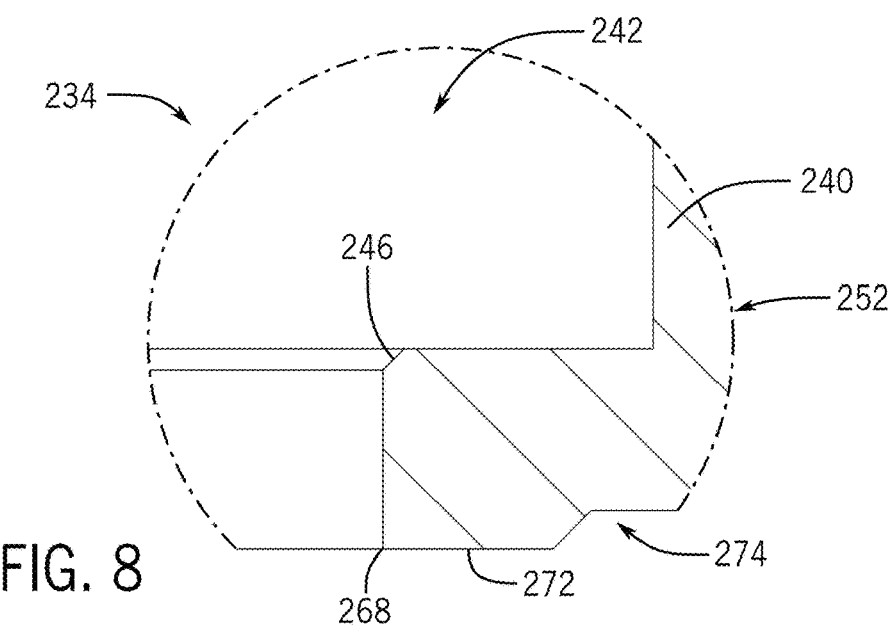
FIG. 8 is a zoomed in cross-sectional side view of the seat retainer and travel stop of FIG. 7.

With reference now to FIGS. 7 and 8, a seat retainer 234 according to another example of the disclosed technology is shown. The seat retainer 234 can be configured for use in a valve seat assembly, including the valve seat assembly 130. For example, the seat retainer 234 may be used in the valve seat assembly 130 in place of the seat retainer 134 (e.g., as interchanged via a retrofit operation). The seat retainer 234 is similar to the seat retainer 134 and includes a seat retainer body 240 that defines an inner bore 242 that extends axially therethrough. Like the seat retainer 134, the inner bore 242 of the seat retainer 234 is bounded by first and second openings 244, 246 at axial ends of the inner bore 242 (i.e., at spindle and sealing ends of the body 240, respectively). The seat retainer body 240 can further include a nozzle section 252, and a grip section 254 having grip surfaces like the seat retainer 134. The seat retainer 234 can further include an exhaust port 260 that provides substantially the same benefits as the exhaust port 206 of the seat retainer 134, as described above.

The seat retainer 234 can further include a shroud 262 at the nozzle section 252 that forms an axially extending cavity 264 adjacent to the second opening 246. In particular, the second opening 246 is formed between the inner bore 242 and the cavity 264 by a radially protruding annular ring of the seat retainer that defines the diameter of the second opening 246 and partially bounds one axial end of the cavity 264. Like the shroud 214 of the seat retainer 134, the shroud 262 of the seat retainer 234 is generally formed by an annular lip that extends around the diameter of the nozzle section 252, although other geometries are possible. As described above, the shroud 262 and cavity 264 can advantageously provide a huddling effect, and thus a supplemental lift force, during a valve relief event to reduce unwanted valve simmer.

The seat retainer 234 can also include other axially protruding features, including as can provide stop against excessive compression of the valve seat 132 and further improve flow characteristics near a set pressure of a particular valve. For example, relative to the cavity 264, the seat retainer body 240 can generally define an inner diameter 268 at the second opening 246 and an outer diameter 270 at an outer wall of the shroud 262. Adjacent to the inner diameter 268 and extending into the cavity 264, the seat retainer body 240 can include a travel stop 272. The travel stop 272 can be configured as an annular or other protrusion that extends axially into the cavity 264 and can be otherwise located in the radial direction in other examples.

In the illustrated example in particular, the travel stop 272 is adjacent to the second opening 246 and extends a smaller distance away from the inner bore 242 than does the outer rim of the shroud. Thus, a channel 274 is formed between the travel stop 272 and the shroud 262, recessed axially into the body 240 relative to the full-diameter portion of the cavity 264 (i.e., as defined below the travel stop 272, relative to the perspective of FIG. 7). In other words, the cavity 264 can exhibit a varied axial depth along a radial reference line, with a reduced axial depth along a first axial protrusion (e.g., the travel stop 272) and an increased axial depth between the first axial protrusion and a second axial protrusion (e.g., the radially outer wall of the shroud 262). In use, the seat retainer 234 can be incorporated into a valve seat assembly, such as the valve seat assembly 130 for example, and the travel stop 272 can be used to abut a nozzle, such as adjacent to the sealing surface 140 of the nozzle 110 (see, for example, FIG. 9).

Figure 9:
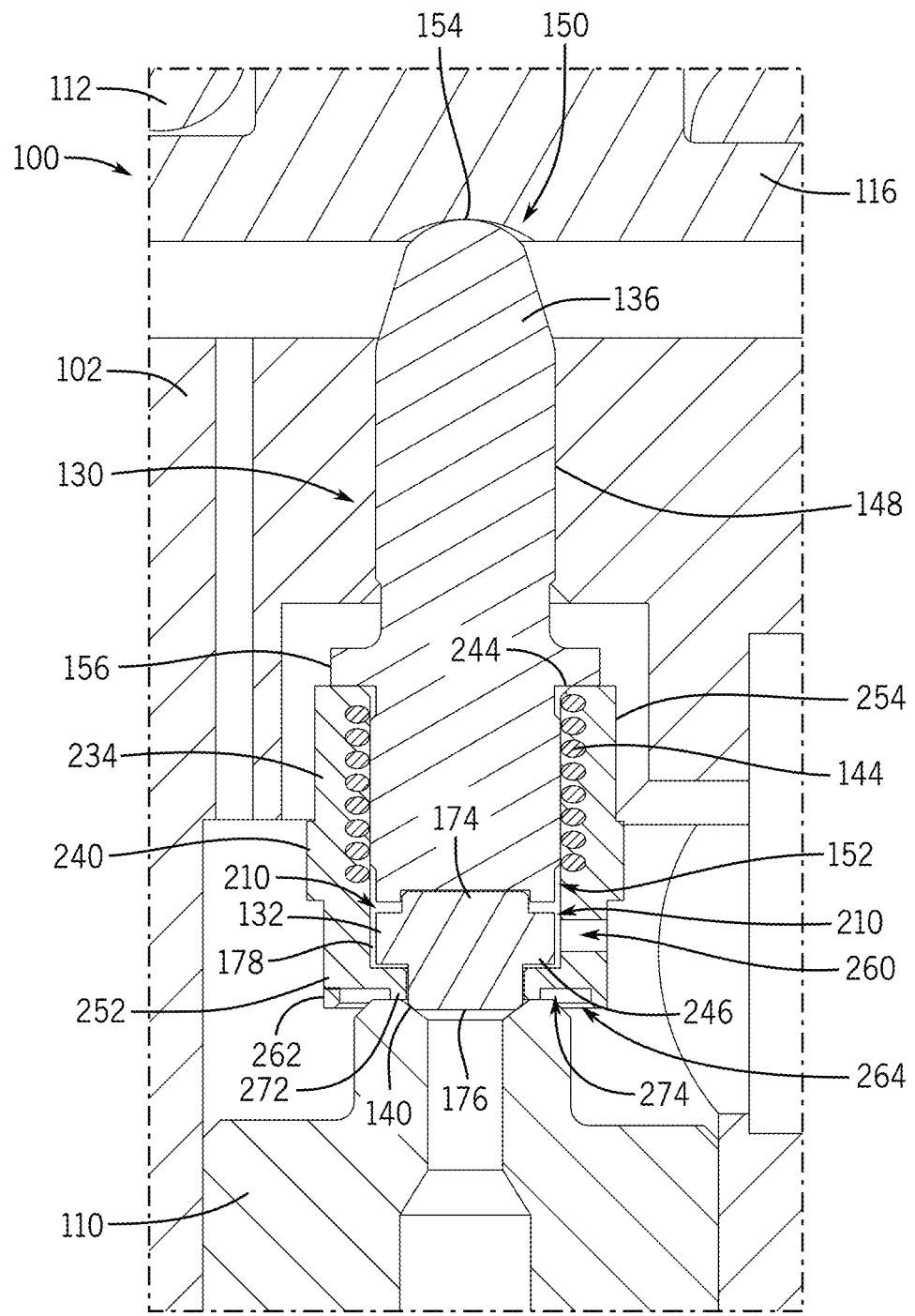
FIG. 9 is a zoomed in cross-sectional side view of the valve and the valve seat assembly of FIG. 1 configured to include the seat retainer of FIG. 7.

Referring briefly back to FIG. 6, when the valve seat assembly 130 is in a sealed orientation within a valve (e.g., valve 100), a sealing surface at the second end 176 of the seat 132 engages the sealing surface 140 of the valve 100 to create a valve seal. In this example, the only contact between the valve seat assembly 130 and the nozzle 110 may be at the valve seat 132. However, in an example of the valve seat assembly 130 that incorporates the seat retainer 234 of FIG. 7 (e.g., in place of the seat retainer 134), as shown in FIG. 9, each of the seat 132 and the travel stop 272 of the seat retainer 234 may engage the nozzle 110 when the seat assembly is in a sealed orientation. Thus, with appropriate configuration of the travel stop 272 and the axially protruding sealing second end 176 of the seat 132, the seat retainer 234 can prevent over-compression of the seat 132 against the sealing surface 140 of the nozzle 110. In this regard, with the seat retainer 234 having the travel stop 272, the force exerted by the main spring 112 is not fully transferred to the seat 132, but to both the seat 132 and the seat retainer 234 when the valve 100 is closed.

In some examples, the seat 132 may be formed from a compressible (or semi-compressible) material so that the seat retainer 134 may travel in an axial direction relative to the nozzle 110 depending on the compressive force of the main spring 112. For example, in some configurations, a certain set pressure (i.e., a relatively high pressure) of the valve 100 may cause over-compression and unwanted deformation at the second end 176 of the seat 132 as the seat 132 is urged (e.g., extruded) into the nozzle 110 and the seat retainer 134 travels closer to the nozzle 110. This deformation can lead to unwanted wearing on the seat 132 or unwanted valve leakage.

Thus, use of a travel stop can extend the lifespan of particular seats, including as employed in combination with the easily installed and replaced seat subassemblies discussed above. However, as also detailed below, flow benefits for valve operation can generally accrue from appropriately varied axial depth in the recess(es) of a shroud of a seat subassembly. Accordingly, although a travel stop as disclosed can beneficially be used in some cases, similar protrusions can be used in other cases that provide axially recessed profiles for improved huddling while not functioning to stop travel of a seat assembly during normal operation. Likewise, the various shroud configurations disclosed herein can generally be used in a variety of seat subassemblies, including as may not include one or more other features as variously described above (e.g., particularly configured valve seats, spindles, valve bodies, nozzles, etc.).

In general, a variety of materials may be suitable for components of the valve seat assembly 130. For example, either of the seat retainers 134, 234 may be formed from metal, and in particular, a metal suitable for high pressure environments. For example, either of the seat retainers 134, 234 may be formed from steel, such as stainless steel 316. In a configuration of the valve seat assembly 130 that uses the seat retainer 234, the travel stop 272 can provide a rigid metal-to-metal contact with the nozzle 110 when the valve is in a sealed orientation. Thus, for example, the seat 132 can provide a seal with the sealing surface 140 of the nozzle 110 while not being over-compressed so as to be permanently deformed or improperly forced into the nozzle 110 beyond the sealing surface 140.

Similar to the seat retainers 134, 234, a variety of materials may be suitable for the seat 132 of the valve seat assembly 130. For example, the seat 132 may include a rigid or relatively rigid material that includes polyamide and glass fiber. In particular, some examples of the seat 132 may include materials Arlon® 3000 XT or Torlon® 5030, other similar materials, or various other suitable materials as dictated by particular process conditions or other factors. (Arlon is a registered trademark of Greene, Tweed Technologies, Inc., and Torlon is a registered trademark of Solvay Specialty Polymers USA, L.L.C.)

Figure 10:
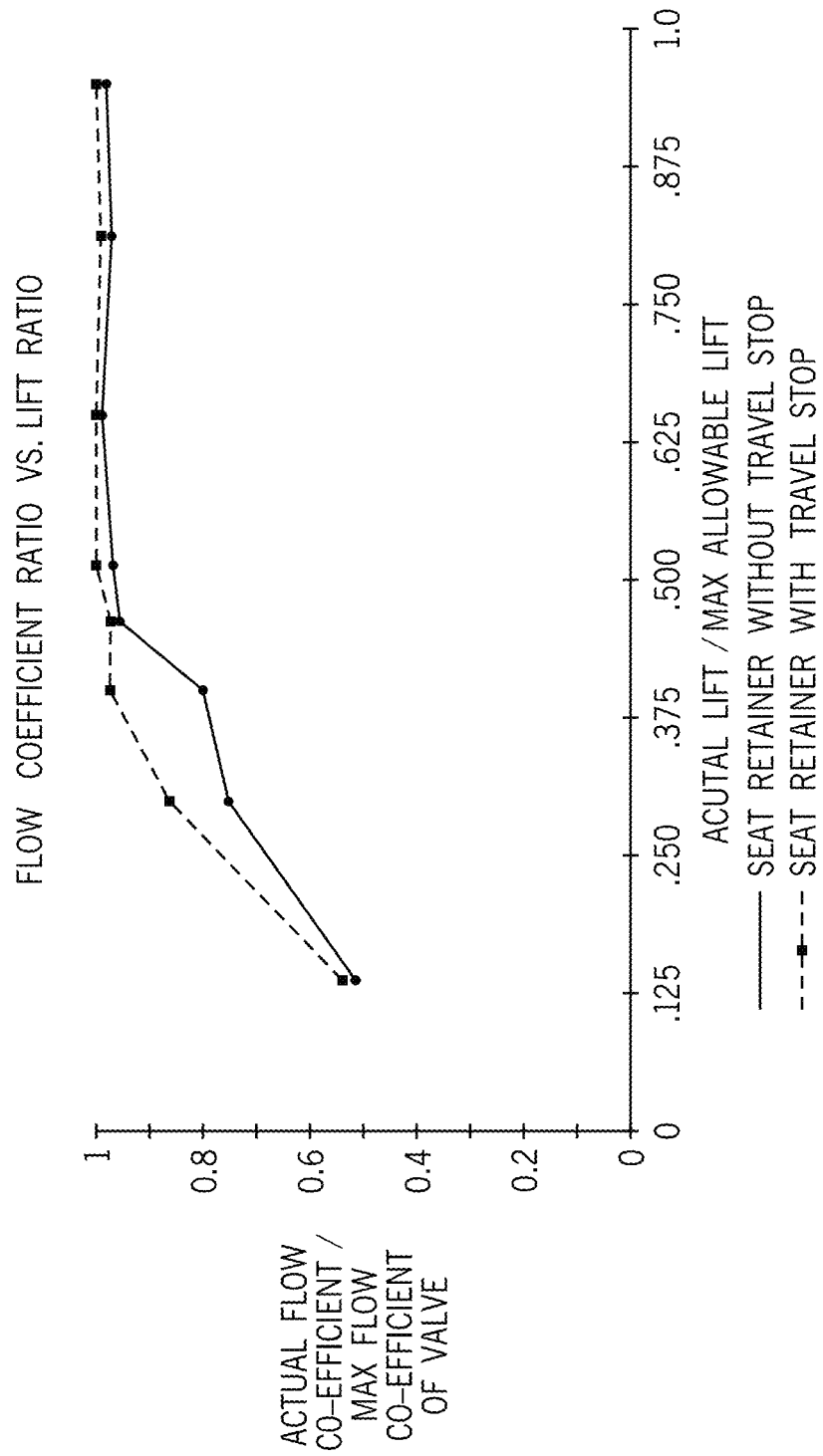
FIG. 10 is an example graph illustrating flow coefficients at various valve lifts for the valve of FIG. 1 with differently configured valve seat assemblies.

Referring now to FIG. 10, a graph illustrating a flow coefficient (e.g., a valve efficiency) versus valve lift is shown for two different valve seat assemblies. The first valve seat assembly represented in the graph includes the seat retainer 134, without a travel stop (or other similarly varied axial recess depth). In contrast, the second valve seat assembly represented in the graph includes the seat retainer 234 with a travel stop 272. As shown, there is generally greater valve efficiency associated with a valve seat assembly having the seat retainer 234 with a travel stop 272. Similar improvements are also generally expected to be provided for other similarly configured shrouds, including due to the improved huddling effect noted above. Thus, in some examples, a valve seat assembly having a valve seat retainer with a varied axial depth shroud feature can increase valve efficiency and reduce valve blowdown. In particular, in some examples, a travel stop may provide an advantageous fluid and fluid pressure diversion into a channel formed between the travel stop and an outer rim of a shroud of the seat retainer to produce an enhanced huddling effect, and thus an enhanced supplemental lift force, to increase valve efficiency.

Thus, examples of the disclosed technology can provide an improvement over conventional valve seat assemblies in spring-operated pressure relief valves. The previous description of the disclosed examples is provided to enable any person skilled in the art to make or use the disclosed technology. Various modifications to these examples will be readily apparent to those skilled in the art, and the generic principles defined herein may be applied to other examples without departing from the spirit or scope of the disclosed technology. Thus, the disclosed technology is not intended to be limited to the examples shown herein but is to be accorded the widest scope consistent with the principles and novel features disclosed herein.

The invention claimed is:

1. A spring-operated relief valve comprising:
    a valve body;
    a nozzle with a nozzle sealing surface;
    a main spring positioned between a bottom spring seat and a top spring seat;
    a valve seat configured to form a seal with the nozzle sealing surface when the spring-operated relief valve is in a closed orientation;
    a spindle having a distal end and a proximal end, the distal end arranged to urge the bottom spring seat toward the top spring seat as the valve seat is moved away from the nozzle during a valve relief event to compress the main spring between the bottom spring seat and the top spring seat; and
    a seat retainer having an inner bore that receives the valve seat and threadably receives the proximal end of the spindle to couple the spindle to the seat retainer and axially secure the valve seat within the inner bore, with a sealing end of the valve seat extending out of the inner bore at a sealing end of the seat retainer.

2. The spring-operated relief valve of claim 1, wherein the sealing end of the seat retainer defines a shroud;
    wherein, with the spring-operated relief valve in the closed orientation to form the seal, the shroud defines a cavity around the seal; and
    wherein the shroud includes an annular lip with an inner diameter that is larger than an outer diameter of the nozzle at the nozzle sealing surface.

3. The spring-operated relief valve of claim 2, wherein the annular lip defines an outer diameter of the sealing end of the seat retainer.

4. The spring-operated relief valve of claim 1, wherein a travel stop extends from the sealing end of the seat retainer, the travel stop being aligned to contact the nozzle when the spring-operated relief valve is in the closed orientation to stop travel of the spindle toward the nozzle.

5. The spring-operated relief valve of claim 4, wherein the travel stop includes an annular protrusion at the sealing end of the seat retainer.

6. The spring-operated relief valve of claim 5, wherein the annular protrusion is adjacent to the sealing end of the valve seat.

7. The spring-operated relief valve of claim 4, wherein the sealing end of the seat retainer defines a cavity around the seal when the spring-operated relief valve is in the closed orientation, and
    wherein the cavity includes a recessed channel partly defined by the travel stop.

8. The spring-operated relief valve of claim 1, wherein the seat retainer includes an exhaust port in communication with the inner bore to vent the inner bore; and
    wherein, the exhaust port is oriented on a spindle side of the seal when the spring-operated relief valve is in the closed orientation.

9. The spring-operated relief valve of claim 1, wherein the proximal end of the spindle includes a recess that receives and aligns the valve seat for compression between the seat retainer and the spindle.

10. The spring-operated relief valve of claim 9, wherein the valve seat defines a first diameter at the sealing end of the valve seat, a second diameter along a body of the valve seat, and a third diameter axially opposite the sealing end of the valve seat; and
    wherein the second diameter is larger than the first diameter and the third diameter is sized to be received within the recess of the spindle.

11. The spring-operated relief valve of claim 9, wherein the spindle includes an exhaust port that extends to vent the recess of the spindle into the inner bore as the valve seat is compressed into the recess.

12. The spring-operated relief valve of claim 1, wherein the spindle includes a collar arranged to provide a stop for threaded installation of the seat retainer onto the proximal end of the spindle.

13. The spring-operated relief valve of claim 1, wherein the spindle, threadably received in the inner bore, compresses the valve seat against the seat retainer.

14. A valve seat assembly for a spring-operated relief valve, the valve seat assembly comprising:
    a valve seat that includes a sealing end with a first diameter and a sealing surface, and a body with a second diameter that is larger than the first diameter;
    a seat retainer having an inner bore with a bore diameter sized to receive the body of the valve seat, the inner bore extending between a first opening at a spindle end of the seat retainer and a second opening defined by an annular projection at a sealing end of the seat retainer; and
    a spindle threadably secured in the inner bore;
    wherein the valve seat is received within the inner bore, with the body of the valve seat seated on the annular projection of the seat retainer and the sealing end of the valve seat extending through the second opening to expose the sealing surface outside of the inner bore; and
    wherein the spindle axially retains the valve seat within the inner bore, with the body of the valve seat seated on the annular projection at the sealing end of the seat retainer.

15. The valve seat assembly of claim 14, wherein the sealing end of the seat retainer defines a shroud that forms a cavity, the cavity arranged to direct fluid in an axial direction to provide a lift force on the valve seat assembly.

16. The valve seat assembly of claim 15, wherein the sealing end of the seat retainer includes a travel stop that extends into the cavity, the travel stop extending a smaller distance away from the inner bore than the shroud.

17. The valve seat assembly of claim 14, wherein the seat retainer includes an exhaust port that extends in a radial direction arranged to exhaust fluid accumulated between the valve seat and the spindle and between the valve seat and the seat retainer.

18. The valve seat assembly of claim 14, wherein the spindle defines a spindle body and includes a collar that extends radially from the spindle body, the collar arranged to engage the seat retainer adjacent to the first opening of the inner bore to provide an axial stop between the spindle and the seat retainer.

19. A method of assembling or retrofitting a valve with a valve seat subassembly, the method comprising:
 forming the valve seat subassembly by:
  inserting a valve seat through a first opening into an inner bore of a seat retainer so that a sealing end of the valve seat extends into a second opening at a sealing end of the inner bore of the seat retainer;
  threading a proximal end of a spindle into the first opening of the inner bore of the seat retainer to axially secure the valve seat within the inner bore;
 arranging, in a valve body of a valve: a bottom spring seat, a spring seated on the bottom spring seat, and a nozzle with a sealing surface; and
 inserting the valve seat subassembly into the valve body so that:
  the sealing end of the valve seat is arranged to form a seal with the sealing surface of the nozzle of the valve when the valve is in a closed orientation; and
  a distal end of the spindle is arranged to receive spring force from the biasing spring of the valve to urge the valve seat subassembly toward the sealing surface of the nozzle.

20. The method of claim 19, wherein threading the proximal end of the spindle into the first opening of the inner bore of the seat retainer compresses the valve seat against the seat retainer.

* * * * *

UNITED STATES PATENT AND TRADEMARK OFFICE
CERTIFICATE OF CORRECTION

| | | |
|---|---|---|
| PATENT NO. | : 12,442,456 B2 | Page 1 of 1 |
| APPLICATION NO. | : 18/529129 | |
| DATED | : October 14, 2025 | |
| INVENTOR(S) | : Chen Jing et al. | |

It is certified that error appears in the above-identified patent and that said Letters Patent is hereby corrected as shown below:

In the Specification

Column 2, Line 57, "scaling" should be --sealing--.

Column 13, Line 62, "scaled" should be --sealed--.

Signed and Sealed this
Second Day of December, 2025

John A. Squires
*Director of the United States Patent and Trademark Office*